United States Patent [19]

Taubitz et al.

[11] Patent Number: 5,019,626
[45] Date of Patent: May 28, 1991

[54] THERMOPLASTIC MOLDING MATERIALS BASED ON POLYPHENYLENE ETHERS AND NYLONS

[75] Inventors: Christof Taubitz, Wachenheim; Hermann Gausepohl, Mutterstadt; Erhard Seiler, Ludwigshafen; Klaus Boehlke, Hessheim; Walter Heckmann, Weinheim, all of Fed. Rep. of Germany

[73] Assignee: BASF Aktiengesellschaft, Ludwigshafen, Fed. Rep. of Germany

[21] Appl. No.: 161,135

[22] Filed: Feb. 26, 1988

[30] Foreign Application Priority Data

Mar. 11, 1987 [DE] Fed. Rep. of Germany .... 3707796.1

[51] Int. Cl.$^5$ .................... C08L 35/06; C08L 71/04; C08L 77/02; C08L 77/06
[52] U.S. Cl. .................................. 525/92; 525/66; 525/68; 525/133; 525/905
[58] Field of Search .................. 525/133, 68, 92, 66, 525/905

[56] References Cited

U.S. PATENT DOCUMENTS

| | | | |
|---|---|---|---|
| 4,128,002 | 9/1985 | Katchman et al. | 525/133 |
| 4,131,598 | 12/1978 | Abolins et al. | 525/133 |
| 4,228,046 | 10/1980 | Lee, Jr. | 525/133 |
| 4,339,376 | 7/1982 | Kasahara et al. | 525/133 |
| 4,387,189 | 6/1983 | Brandstetter et al. | 525/68 |
| 4,728,693 | 3/1988 | Dröschen et al. | 525/133 |
| 4,745,157 | 5/1988 | Yates, III et al. | 525/133 |

FOREIGN PATENT DOCUMENTS

| | | |
|---|---|---|
| 0046040 | 2/1982 | European Pat. Off. . |
| 0142166 | 5/1985 | European Pat. Off. . |
| 0147874 | 7/1986 | European Pat. Off. . |
| 3601581 | 7/1987 | Fed. Rep. of Germany . |

*Primary Examiner*—Allan M. Lieberman
*Attorney, Agent, or Firm*—Oblon, Spivak, McClelland, Maier & Neustadt

[57] ABSTRACT

Thermoplastic molding materials contain, as essential components,
  A) 5–92% by weight of a polyphenylene ether which can contain up to 50% by weight of a styrene polymer which differs from C),
  B) 5–92% by weight of a nylon,
  C) 3–50% by weight of a copolymer composed of $C_1$) 97–99.9% by weight of styrene and/or substituted styrenes of the general formula I

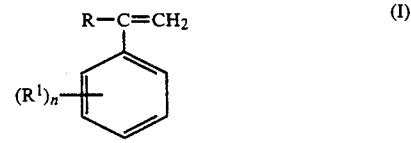

where R is hydrogen, alkyl of 1 to 8 carbon atoms or halogen, $R^1$ is alkyl of 1 to 8 carbon atoms or halogen and n is 0, 1, 2 or 3,
  $C_2$) 0.1–3% by weight of an $\alpha,\beta$-unsaturated dicarbonyl compound and
  $C_3$) 0–10% by weight of further, nonionic comonomers, and
D) 0–35% by weight of a rubber impact modifier.

3 Claims, No Drawings

THERMOPLASTIC MOLDING MATERIALS BASED ON POLYPHENYLENE ETHERS AND NYLONS

The present invention relates to thermoplastic molding materials containing, as essential components, A) 5–92% by weight of a polyphenylene ether which can contain up to 50% by weight of a styrene polymer which differs from C), B) 5–92% by weight of a nylon, C) 3–50% by weight of a copolymer consisting of
C1) 97–99.9% by weight of styrene and/or substituted styrenes of the general formula I

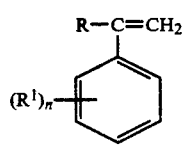

where R is hydrogen, alkyl of 1 to 8 carbon atoms or halogen, $R^1$ is alkyl of 1 to 8 carbon atoms or halogen and n is 0, 1, 2 or 3, C2) 0.1–3% by weight of an $\alpha,\beta$-unsaturated dicarbonyl compound and C3) 0–10% by weight of further, nonionic comonomers, and D) 0–35% by weight of a rubber impact modifier.

The present invention furthermore relates to the use of such molding materials for the production of moldings and to moldings obtainable from the novel molding materials as essential components.

EP-A-46 040 discloses molding materials which are based on polyphenylene ethers and nylons and contain a copolymer which has units of vinylaromatic monomers and $\alpha,\beta$-unsaturated dicarboxylic anhydrides or dicarboximide.

According to the Examples, the copolymers used contain as a rule more than 8, in particular not less than 10, mol % of a dicarboxylic anhydride or dicarboximide.

EP-A-147 874 describes thermoplastic molding materials which consist of polyphenylene ethers and nylons and contain a copolymer of vinylaromatic monomers and $\alpha,\beta$-unsaturated dicarboxylic acids, the content of dicarboxylic acids in the monomer mixture being from 41 to 50 mol %. The copolymer is added in an amount from 0.1 to 1.9% by weight to the materials consisting of nylons and polyphenylene ethers.

The disadvantage of these known materials is that they have little flow, which has an adverse effect during injection molding.

It is an object of the present invention to provide thermoplastic molding materials which are based on polyphenylene ethers and nylons and possess good mechanical properties and good flow.

We have found that this object is achieved, according to the invention, by the thermoplastic molding materials defined at the outset.

Preferred materials of this type are described in the subclaims.

The novel molding materials are distinguished by good mechanical properties, in particular good impact strength and substantially improved flow compared with known molding materials.

The novel thermoplastic molding materials have the advantage that they are easy to process and have good mechanical properties and high impact strength and solvent resistance. Moreover, moldings produced from the molding materials do not exhibit any delamination.

The polyphenylene ethers A) contained in the novel molding materials are known per se. They are compounds based on substituted, in particular disubstituted, polyphenylene oxides, in which the ether oxygen of one unit is bonded to the benzene nucleus of the adjacent unit. Polyphenylene oxides substituted in the 2- and/or 6-position with respect to the oxygen atom are preferably used, and advantageously not less than 50 units are bonded to one another. Examples of substituents are halogen, such as chlorine or bromine, and alkyl of 1 to 4 carbon atoms which preferably has a tertiary $\alpha$-hydrogen atom, e.g. methyl, ethyl, propyl or butyl. The alkyl radicals may in turn be substituted by halogen, such as chlorine or bromine, or by hydroxyl. Other examples of possible substituents are alkoxy, preferably of not more than 4 carbon atoms, or phenyl which is unsubstituted or substituted by halogen and/or alkyl. Copolymers of different phenols, for example copolymers of 2,6-dimethylphenol and 2,3,6-trimethylphenol, are also suitable. Mixtures of different polyphenylene ethers can of course also be used.

Examples of polyphenylene ethers are poly-(2,5-dilauryl-1,4-phenylene) oxide, poly-(2,6-diphenyl-1,4-phenylene) oxide, poly-(2,6-dimethoxy-1,4-phenylene) oxide, poly-(2,6-diethoxy-1,4-polyphenylene) oxide, poly-(2-methoxy-6-ethoxy-1,4-phenylene) oxide, poly-(2-ethyl-6-stearyloxy-1,4-phenylene) oxide, poly-(2,6-dichloro-1,4-phenylene) oxide, poly-(2-methyl-6-phenylene-1,4-phenylene) oxide, poly-(2,6-dibenzyl-1,4-phenylene) oxide, poly-(2-ethoxy-1,4-phenylene) oxide, poly-(2-chloro-1,4-phenylene) oxide and poly-(2,5-dibromo-1,4-phenylene) oxide. Preferably used polyphenylene ethers are those in which the substituents are alkyl of 1 to 4 carbon atoms, e.g. poly-(2,6-dimethyl-1,4-phenylene) oxide, poly-(2,6-diethyl-1,4-phenylene) oxide, poly-(2-methyl-6-ethyl-1,4-phenylene) oxide, poly-(2-methyl-6-propyl-1,4-phenylene) oxide, poly-(2,6-dipropyl-1,4-phenylene) oxide and poly-(2-ethyl-6-propyl-1,4-phenylene) oxide.

Regarding their physical properties, preferred polyphenylene ethers are those which have a relative viscosity of from 0.4 to 0.7 dl/g, measured in 1% strength by weight solution in chloroform at 30° C.

The content of the polyphenylene ether in the novel molding materials is not critical; it is from 5 to 92, preferably from 10 to 89%, by weight, based on the total weight of components A)-D). Particularly preferred molding materials are those which contain from 20 to 47, in particular from 25 to 40%, by weight of polyphenylene ethers.

The polyphenylene ethers used as component A) can be partially replaced by styrene polymers which differ from C). Preferably, up to half the amount of the polyphenylene ether is replaced by such styrene polymers. Examples of styrene polymers of this type are polystyrene, poly-$\alpha$-methylstyrene and poly-p-methylstyrene, polystyrene being preferred. Other preferred styrene polymers are those which have been prepared in the presence of from 2 to 20% by weight of an elastomeric polymer. Elastomeric polymers based on butadiene, e.g. styrene/butadiene polymers, polybutadiene and butadiene/styrene block copolymers, are suitable. Where styrene/diene block copolymers are used, it has proven advantageous if up to 20% of the content of polyphenylene oxide are replaced with butadiene/styrene or isoprene/styrene block copolymers or their hydrogenated products.

It is advantageous in some cases if up to 40, preferably up to 20%, by weight, based on the total weight of the molding materials, of the polyphenylene ethers are replaced with a modified polyphenylene ether A′. In general, however, completely satisfactory products are also obtained using unmodified polyphenylene ethers alone.

The term modified is to be understood as meaning a change in the polyphenylene ether due to the reaction of the components $a_1$) to $a_5$) described below.

Components $a_1$) are conventional polyphenylene ethers which can be prepared, for example, from o-disubstituted phenols by oxidative coupling. Preferably used polyphenylene ethers are those which are compatible with vinylaromatic polymers, i.e. completely or substantially soluble in these polymers (cf. A. Noshay, Block Copolymers, pages 8-10, Academic Press, 1977, and O. Olabisi, Polymer-Polymer Miscibility, 1979, pages 117-189).

The amount of component $a_1$) is from 4.95 to 99.95, preferably from 10 to 99.95, in particular from 50 to 90%, by weight based on the sum of components $a_1$) to $a_5$).

The polyphenylene ethers used generally have a weight average molecular weight of from 10,000 to 80,000, preferably from 15,000 to 60,000.

A few polyphenylene ethers, as mentioned in, inter alia, O. Olabisi, loc cit, pages 224-230 and 245, are mentioned here merely by way of example: poly-(2,6-diethyl-1-phenylene) oxide, poly-(2-methyl-6-ethyl-1,4-phenylene) oxide, poly-(2-methyl-6-propyl-1,4-phenylene) oxide, poly-(2,6-dipropyl-1,4-phenylene) oxide, poly-(2-ethyl-6-propyl-1,4-phenylene) oxide and preferably poly-(2,6-dimethyl-1,4-phenylene) oxide, and copolymers such as those which contain 2,3,6-trimethylphenol, as well as polymer blends. However, poly-(2,6-dimethyl-1,4-phenylene) oxide is particularly preferred.

Component $a_2$), which may or may not be present in the modified polyphenylene ether, is a vinylaromatic polymer which is preferably compatible with the polyphenylene ether used.

The molecular weight of these polymers is in general from 1,500 to 2,000,000, preferably from 70,000 to 1,000,000.

Examples of preferred vinylaromatic polymers which are compatible with polyphenylene ethers are given in the abovementioned monograph by Olabisi, pages 224-230 and 245. Vinylaromatic polymers of styrene, chlorostyrene, α-methylstyrene and p-methylstyrene are mentioned here merely as typical examples; furthermore, comonomers, such as (meth)acrylonitrile or (meth)acrylates may also be present as components in minor amounts (preferably not more than 20, in particular not more than 8%, by weight). A particularly preferred vinylaromatic polymer is polystyrene. Of course, blends of these polymers can also be used.

Processes for the preparation of such vinylaromatic polymers are known per se and are described in the literature, so that no further information is required here.

Bulk, suspension, emulsion and solution polymerization are mentioned here as suitable polymerization processes, merely by way of example.

The amount of the vinylaromatic polymer $a_2$) in component A′) is from 0 to 90, preferably from 0 to 70, in particular from 0 to 60%, by weight.

The modified polyphenylene ether A′) contains one or more of the compounds $a_{31}$) to $a_{35}$) as essential component $a_3$).

In principle, mixtures of different compounds $a_{31}$) to $a_{35}$) can also be used, but it is generally advantageous to use only one of these types of compounds.

Component $a_{31}$) is fumaric acid, which is used in an amount from 0.05 to 10, preferably from 0.1 to 5%, by weight, based on the sum of components $a_1$) to $a_5$).

Where fumaric acid ($a_{31}$) is used as component $a_3$), it has frequently proven advantageous if the molding materials have a certain minimum content of vinylaromatic polymers $a_2$), preferably not less than 1.95, in particular not less than 4.95%, by weight, based on modified polyphenylene ether.

Components $a_{32}$) are maleimides of the general formula II

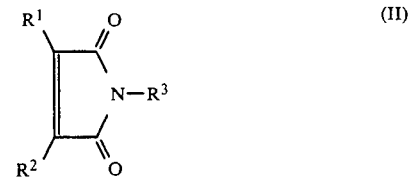

where $R^1$, $R^2$ and $R^3$ are each hydrogen or an alkyl, alkoxy, cycloalkyl, alkenyl, aryl, arylene or alkylene group of 1 to 12 carbon atoms.

$R^1$, $R^2$ and $R^3$ are each preferably alkyl of 1 to 4 carbon atoms, e.g. methyl, ethyl, n-butyl, isobutyl or tert-butyl, cycloalkyl of not more than 8 carbon atoms or phenyl which may be substituted by alkyl or alkoxy.

N-methylmaleimide, N-butylmaleimide, N-cyclohexylmaleimide, N-phenylmaleimide, N-(p-methylphenyl)-maleimide, N-(3,5-dimethyphenyl)-maleimide, N-(p-methoxyphenyl)-maleimide, N-benzylmaleimide, N-(1-naphthyl)-maleimide and mixtures of these are mentioned as preferred maleimides, merely by way of example. Among these, N-phenylmaleimide is particularly preferred.

The amount of the maleimide of the general formula II is from 0.05 to 10, preferably from 0.1 to 5%, by weight, based on the sum of components $a_1$) to $a_5$).

Other suitable components $a_3$) are monomers which contain amide groups and one or more polymerizable double bonds, preferably those of the general formulae III or IV

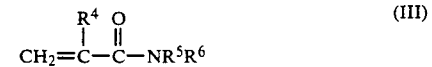

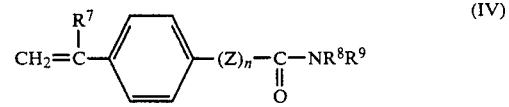

where $R^4$, $R^5$, $R^6$, $R^7$, $R^8$ and $R^9$ are each hydrogen, an alkyl or alkoxy group of 1 to 12 carbon atoms, cycloalkyl of not more than 12 carbon atoms or aryl, Z is alkenyl of 1 to 12 carbon atoms and n is 0 or 1, preferably 0.

Preferred substituents $R^5$, $R^6$, $R^8$ and $R^9$ are alkyl of 1 to 10 carbon atoms, cycloalkyl of not more than 8 carbon atoms or aryl, preferably phenyl. $R^4$ and $R^7$ are each preferably H or methyl.

Acrylamide, N-methyl-, N-ethyl-, N-propyl-, N-butyl-, N-pentyl-, N-hexyl-, N-heptyl-, N-octyl-, N-nonyl and N-(2-ethylhexyl)-acrylamide, N-cyclohexylacrylamide, N-phenylacrylamide and the corresponding N,N-derivatives, such as N,N-dimethylacrylamide, and the corresponding methacrylamides and mixtures of these are mentioned here as examples.

Arcylamide, methacrylamide, N-phenylacrylamide and N-phenylmethacrylamide are preferably use.

The amount of component $a_{33}$ is from 0.05 to 10, preferably 0.1 to 10, in particular from 1 to 5%, by weight, based on the sum of components $a_1$) to $a_5$).

A monomer which contains lactam groups and has one or more polymerizable double bonds ($a_{34}$) can also be used as component $a_3$).

Preferably used lactams are those of the general structure V

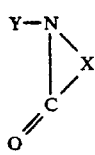

where X is straight-chain or branched alkylene of 2 to 15 carbon atoms and Y is of the general formula

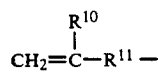

where $R^{10}$ is hydrogen or an alkyl or alkoxy group of 1 to 4 carbon atoms and $R^{11}$ is a divalent substituent

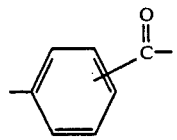

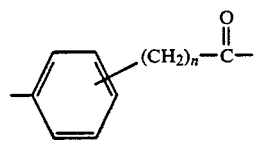

where n is an integer from 1 to 4.

Preferred substituents Y are, very generally, vinyl, acryloyl or methacryloyl structures or radicals having basic styrene structures.

Particularly preferred are lactam units which are polymerizable or copolymerizable to give nylons, as described in Houben-Weyl, Methoden der organ. Chemie, Volume X/2, pages 511–587 (1958), and Volume XIV/2, pages 111–131.

Examples are β-propiolactams (azetidin-2-ones), such as

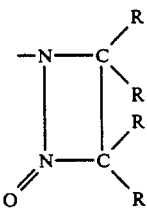

where the radicals R are identical or different alkyl groups of 1 to 6 carbon atoms or hydrogen. Compounds of this type are described in R. Graf, Angew. Chem. 74 (1962), 523–530 and H. Bastian, Angew. Chem. 80 (1968), 304–312.

3,3'-Dimethyl-3-propiolactam is mentioned merely as a typical example of this group.

Other preferred lactam units are 2-methylpyrrolidones

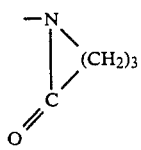

ε—caprolactam, such as

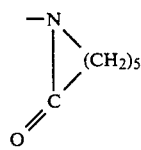

and 7-enantholactam, 8-capryllactam and 12-laurolactam, as described in K. Dachs, Angew. Chem. 74 (1962), 540–545. 2-pyrrolidones and 6-caprolactams are very particularly preferred.

Mixtures of these compounds can also be used.

The lactam units are preferably incorporated in the polyphenylene ethers A' via a carbonyl group on the nitrogen, as shown in general below.

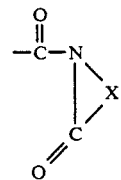

One particularly preferred example of a component $a_{34}$ is a N-(meth)acryloyl-ε-caprolactam

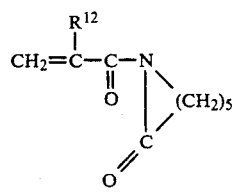

where $R^{12}$ is hydrogen or methyl.

The amount of component $a_{34}$ is from 0.05 to 10, preferably from 0.1 to 10, in particular from 0.5 to 5%, by weight based on the sum of the components $a_1$) to $a_5$).

Components $a_{35}$) are half esters or hemiamides of α,β-unsaturated dicarboxylic acids. Examples of preferred dicarboxylic acids are maleic acid, fumaric acid, chloromaleic acid, dichloromaleic acid, methylmaleic acid, butenylsuccinic acid and tetrahydrophthalic acid, maleic acid and fumaric acid being particularly preferred.

To prepare the half esters or hemiamides, these acids or their anhydrides can be reacted with the corresponding alcohols or amines. Appropriate processes are known per se and are described in the literature, so that no further information is required here.

Primary and secondary monoalcohols, such as methanol, ethanol, n- and isopropanol, n- and isobutanol, pentanols, hexanols, heptanols, octanols, e.g. 2-ethylhexyl alcohol, and higher alcohols, such as dodecanols and cycloaliphatic alcohols, e.g. cyclohexanol, are preferably used as alcohols for the preparation of the half esters. Alcohols containing aromatic structural units, e.g. benzyl alcohol, are also suitable. In addition to C, H and O, the alcohols can also contain heteroatoms, such as N, O, S and Si, in the main chain or as substituents. Finally, alcohols containing keto groups in the chain or having halogen substituents may also be mentioned. However, alkanols of 1 to 6 carbon atoms are preferred.

Secondary amines and N-alkylanilines very generally may be mentioned as amines for the preparation of the hemiamides. Examples of these are N-methyl- and N-ethylalkylamines and N-methylaniline. As in the case of the alcohols, the amines may also contain heteroatoms and functional groups.

Very generally, half esters are preferred to hemiamides. The amount of $a_{35}$) is from 0.05 to 10, preferably from 0.1 to 5%, by weight, based on the total weight of components A').

Molding materials which contain the component $a_{35}$) frequently have particularly good flow characteristics, i.e. particularly high melt flow indices (MFI).

If necessary, further comonomers $a_4$) which react under the preparation conditions with the components $a_1$) and, where relevant, $a_2$), or are grafted onto the said components, may be used in the preparation of the modified polyphenylene ether A'). Examples of these are acrylic acid, methacrylic acid, acrylates, methacrylates and vinylaromatic monomers, such as styrene, α-methylstyrene and vinyltoluene, to mention but a few.

The amount of components $a_4$) is from 0 to 80, preferably from 0 to 45, in particular not more than 20%, by weight, based on the sum of components $a_1$) to $a_5$). Particularly preferred molding materials are those which do not contain any component $a_4$).

Up to 20% by weight of free radical initiators can be used as component $a_5$) in the preparation of the modified polyphenylene ethers A').

The amount of component $a_5$) is as a rule smaller than the sum of the amounts of components $a_3$) and $a_4$). Preferably, this component is an organic peroxide or an azo compound.

Organic peroxides having a half life of from 1 to 30 sec at 200° C. are particularly preferred. The choice of the free radical initiator depends on the desired reaction temperature.

Examples of free radical initiators are di-(2,4-dichlorobenzoyl) peroxide, tert-butyl peroxide, di-(3,5,5-trimethylhexanol)-peroxide, dilauroyl peroxide, didecanoyl peroxide, dipropionyl peroxide, dibenzoyl peroxide, tertbutyl peroxy-2-ethylhexanoate, tert-butyl peroxydiethylacetate, tert-butyl peroxyisobutyrate, 1,1-di-tert-butylperoxy-3,3,5-trimethylcyclohexane, tert-butyl peroxyisopropylcarbonate, tert-butyl peroxy-3,3,5-trimethylhexanoate, tert-butyl peracetate, tert-butyl perbenzoate, butyl 4,4-di-tert-butylperoxyvalerate, 2,2-di-tert-butylperoxybutane, dicumyl peroxide, tert-butyl cumyl peroxide, 1,3-di-(tert-butylperoxyisopropyl)-benzene, di-tert-butyl peroxide, diisopropylbenzene monohydroperoxide, cumene hydroperoxide, tert-butyl hydroperoxide, 2,2-azodi-(2,4-dimethylvaleronitrile) and azobisisobutyronitrile, dicumyl peroxide being particularly preferred.

It has frequently proven advantageous to omit the component $a_5$). This is true in particular when fumaric acid ($a_{31}$) is used as component $a_3$), since in this case undesirable side reactions may occur when free radical initiators are used.

To prepare the modified polyphenylene ether A', the components $a_1$) to $a_5$) can be reacted with one another at from 250° to 350° C., preferably from 265° to 295° C. Extruders are particularly suitable for this purpose, since in general they also permit thorough mixing of the components. The residence times are in general from 0.5 to 30, preferably from 1 to 3, minutes. Twin-screw extruders are particularly useful for the novel process.

The novel molding materials contain one or more nylons as component B). Although there are no restrictions with regard to the structure of the nylons, preferred nylons are those which are derived from lactams having from 7 to 13 ring members, e.g. polycaprolactam, polycapryllactam or polylaurolactam, and nylons which are obtained by reacting dicarboxylic acids with diamines. Examples of dicarboxylic acids, which may also be used in combination, are alkanedicarboxylic acids of 6 to 12, in particular 6 to 10, carbon atoms and terephthalic acid and isophthalic acid. Examples of diamines, which may like-wise be used in combination, are alkanediamines of 6 to 12, in particular 6 to 8, carbon atoms, as well as m-xylylenediamine, bis-(4-aminophenyl)-methane, bis-(4-aminocyclohexyl)-methane and 2,2-bis-(4-aminophenyl)-propane. Mixtures of nylons prepared in this manner can also be used. Of particular industrial importance are polycaprolactam and polyhexamethylenesebacamide, as well as nylons prepared from hexamethylenediamine and isophthalic and/or terephthalic acid.

There are also no special restrictions with regard to the physical properties, although linear nylons having a relative viscosity of from 2.2 to 4.5, measured in 96% strength sulfuric acid (1 g/100 ml) at 23° C., are preferred.

As in the case of component A), the amount of component B) in the novel molding materials is not subject to any narrow restrictions, although from 5 to 92, preferably from 10 to 89%, by weight, based on the total weight of components A) to D), of the nylon are likewise used. Particularly preferred molding materials contain from 35 to 72, very particularly preferably from 45 to 72%, by weight of a nylon. All percentages are based on the total weight of components A) to D).

The novel molding materials contain, as an essential component C), a copolymer of $C_1$) from 97 to 99.9% by weight of styrene and/or substituted styrenes of the general formula I

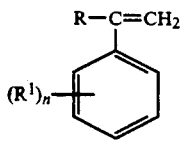

(I)

where R is hydrogen or alkyl of 1 to 8 carbon atoms, $R^1$ is alkyl of 1 to 8 carbon atoms or halogen and n is 0, 1, 2 or 3, $C_2$) from 0.1 to 3% by weight of an $\alpha,\beta$-unsaturated dicarbonyl compound and $C_3$) from 0 to 10% by weight of further nonionic comonomers.

Among the substituted styrenes of the general formula I, $\alpha$-methylstyrene and p-methylstyrene are particularly preferred, but, for example, the various ethyl- and chlorostyrenes (m-, o- and p-), to mention but a few, are also suitable.

In principle, all $\alpha, \beta$-unsaturated dicarbonyl compounds, in particular $\alpha,\beta$-unsaturated dicarboxylic acids and their anhydrides, half esters, esters, amides and imides and mixtures of these are suitable as component $C_2$).

Maleic acid, maleic anhydride, half esters of maleic acid with alcohols of 1 to 8, in particular 1 to 4, carbon atoms and the corresponding fully esterified maleic acid derivatives may be mentioned as examples here. Preferred examples of the last two groups are monomethyl maleate and dimethyl maleate, the former being particularly preferred.

Other dicarboxylic acids which can be used as such or in the form of their appropriate derivatives are fumaric acid, chloromaleic acid, dichloromaleic acid, methylmaleic acid, butenylsuccinic acid and tetrahydrophthalic acid.

Examples of imides are maleimide and N-phenylmaleimide.

The amount of the monomer $C_2$) is 0.1-3, preferably 0.25-2, in particular 0.5-1.5%, by weight, based on the total weight of components $C_1+C_2$) and, where relevant, $C_3$). Amounts of 1% by weight have proven sufficient in many cases.

Up to 10, preferably up to 5%, by weight of other, nonionic comonomers can be used as component $C_3$). Particularly preferred products are those which do not have an adverse effect on the desired particle morphology. Examples of these are methyl acrylate, acrylonitrile and methacrylonitrile. In general, it has proven advantageous to dispense with component $C_3$).

The weight average molecular weight of the copolymers C) is in general from 10,000 to 2,000,000, preferably from 40,000 to 300,000.

The amount of the copolymer C) is 3-50, preferably 5-20, in particular 8-14%, by weight, based on the total weight of the molding material.

The copolymers C) used according to the invention can be prepared in a conventional manner by bulk, solution, emulsion or suspension polymerization, either continuously or batchwise. The monomers are preferably polymerized in a suitable solvent, e.g. ethylbenzene. In a particularly preferred embodiment, the monomers, e.g. styrene and chloromethylvinylbenzene, are polymerized at from 120° to 150° C. using a free radical initiator or, in particular, thermally, i.e. without a free radical initiator, by a continuous method under superatmospheric pressure. In a very preferred embodiment, $C_1$) and $C_2$) are subjected to a thermal reaction by a continuous procedure at about 140° C. under about 10 bar during a residence time of about 6 hours.

The novel thermoplastic molding materials can contain, as component D), from 0 to 35, preferably from 2 to 25, in particular from 5 to 20%, by weight of a rubber impact modifier. Rubbers having a glass transition temperature of less than 0° C. are generally preferred.

Rubbers can modify either the nylon phase or the polyphenylene ether phase or both phases.

Rubber impact modifiers for nylons are, for example, polybutadiene/acrylate, styrene/butadiene, polybutene, hydrogenated styrene/butadiene, acrylonitrile/butadiene, ethylene/propylene and polyisoprene rubbers. Styrenegrafted ethylene/propylene rubbers, thermoplastic ethylene/ propylene rubbers, thermoplastic polyester elastomers, ethylene rubbers and ionomers, styrene/butadiene block copolymers, including AB-ABA tapering, star polymers and block polymers, corresponding isoprene block copolymers and partially or completely hydrogenated block copolymers are also suitable. Other examples of rubber impact modifiers for nylons are described in EP-A-144 767.

In a preferred embodiment, the novel molding materials contain rubber impact modifiers which toughen the polyphenylene ether phase and accordingly are dispersed in the latter.

Rubbers of this type are described in, for example, German Laid-Open Application DOS 2,506,094 and EP-A-137 546.

These are in principle the same rubbers as those used for modifying the nylons. Block copolymers of styrene, methylstyrene, butadiene and/or isoprene units, for example having an AB, ABA, ABAB, ABC or star-like structure (radial teleblock copolymers), are particularly preferred; the elastomeric phase can be partially or completely hydrogenated and the blocks can also have tapering transitions.

The novel thermoplastic molding materials can contain, as further components, conventional additives and processing assistants in effective amounts. The amount of these is preferably not more than 45, particularly preferably not more than 30%, by weight, based on the total weight of components A) to D). Heat stabilizers, light stabilizers, lubricants, mold release agents, colorants, e.g. dyes and pigments, reinforcing agents, such as glass fibers, asbestos fibers, carbon fibers or aromatic nylon fibers, and/or fillers, such as gypsum fibers, synthetic calcium silicates, kaolin, calcined kaolin, wollastonite, talc or chalk, and flameproofing agents, such as inorganic and organic phosphorus compounds, may be mentioned here merely by way of example. Other low molecular weight or high molecular weight polymers may also be present as additives in the novel molding materials.

Preferably, the composition of the novel thermoplastic molding materials is such that the polyphenylene ether A) is the dispersed phase and the nylon B) is the continuous phase. Particularly preferably, the molding materials do not contain any separate phase of the copolymer C), as would be detectable in electron micrographs or shear modulus curves. The polyphenylene ether in the continuous phase preferably has a mean particle size (number average) of not more than 0.5 $\mu$m, in particular 0.35 $\mu$m.

The novel thermoplastic molding materials are advantageously prepared by mixing the components at from 250° to 320° C. in a conventional mixing apparatus, for example a kneader, a Banbury mixer or a single-screw extruder, preferably in a twin-screw extruder. In order to obtain a very homogeneous molding material, thorough mixing is essential. The order in which the components are mixed can be varied; two or, where relevant, three components can be premixed or all components can be mixed together.

The novel thermoplastic molding materials can be converted by injection molding or extrusion to moldings having advantageous properties, in particular good impact strength and good flow.

EXAMPLES

The following components were used to prepare molding materials according to the invention:

A: Poly-(2,6-dimethyl-1,4-phenylene) ether having a relative viscosity of 0.51 (measured in 1% strength by weight solution in chloroform at 30° C.)

B: Polyhexamethyleneadipamide (nylon 6,6) having a mean molecular weight (number average) of 20,000

$C_1$: Styrene/monomethyl maleate copolymer of 98.7% by weight of styrene and 1.3% by weight of monomethyl maleate, prepared by continuous solution polymerization at 135° C. and under 8 bar during a residence time of 5 hours using 20% by weight, based on the total weight of the monomers, of ethylbenzene (weight average molecular weight: 75,000).

$C_2$: Styrene/monoethyl maleate copolymer of 99% by weight styrene and 1% by weight of monoethyl maleate, prepared as described under $C_1$.

D: Styrene/butadiene/styrene 3-block copolymer (Cariflex TR 1102 from Shell).

Thermoplastic molding materials which contained the following copolymers instead of the novel copolymers $C_1$ and $C_2$ were prepared for comparison:

$V_1$: Styrene/maleic anhydride copolymer containing 11% by weight of maleic anhydride and modified with 15% by weight of rubber (Dylark 250 according to European Patent 46,040, Examples 11-13).

$V_2$: Styrene/maleic anhydride copolymer containing 53% by weight of maleic anhydride (according to EP-A 147 874, Example 1).

The molding materials were prepared by mixing the components in a twin-screw extruder at 280° C. and then extruding the mixture. After granulation, the products were injection molded to give test specimens, on which the notched impact strength according to DIN 53,453 was determined.

Furthermore, the melt flow index according to DIN 53,735 was determined at 280° C. and under a load of 2.16 kg.

Finally, electron micrographs of the molding materials were prepared. These showed that the mean particle size (number average) in all molding materials according to the invention was less than 0.35 μm.

The composition of the individual molding materials and the results of the notched impact strength and melt flow index measurements are shown in Table 1.

TABLE 1

| Example | Component A | Component B | Component C | Component D | Notched impact strength DIN 53,453 at °C. kJ/m² | Melt flow index 280° C./2.16 kg DIN 53,735 g/10 min |
|---|---|---|---|---|---|---|
| 1 V | 45.45 | 45.45 | — | 9.1 | 1.5 | 3.1 |
| 2 V | 45.0 | 45.0 | 0.9 $V_2$ | 9.1 | 2.8 | 3.0 |
| 3 V | 41.7 | 41.7 | 8.3 $V_1$ | 8.3 | 2.7 | 3.6 |
| 4 | 41.7 | 41.7 | 8.3 $C_1$ | 8.3 | 12.0 | 7 |
| 5 | 36.9 | 45.1 | 9.0 $C_1$ | 9.0 | 13.5 | 9 |
| 6 | 41.7 | 41.7 | 8.3 $C_2$ | 8.3 | 10.0 | 6 |

We claim:

1. A thermoplastic molding material comprising as essential components:
   A) 5 to 92% by weight of a polyphenylene ether which contains from 0 to 50% by weight of a styrene polymer which differs from component C);
   B) 5 to 92% by weight of a nylon;
   C) 3 to 50% by weight of a copolymer which does not form a separate phase and which is composed of
      $C_1$) 97 to 99.9% by weight of at least one monomer selected from the group consisting of styrene and substituted styrene compounds of the formula I:

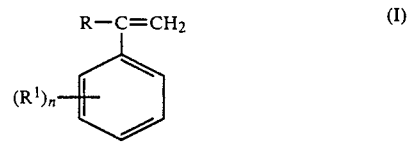

where R is hydrogen, alkyl of 1 to 8 carbon atoms or halogen, $R^1$ is alkyl of 1 to 8 carbon atoms or halogen and n is 0, 1, 2 or 3,
      $C_2$) 0.1 to 3% by weight of a half ester of an $\alpha,\beta$-unsaturated dicarboxylic acid, and
      $C_3$) 0 to 10% by weight of additional, nonionic comonomers; and
   D) 0 to 35% by weight of a rubber impact modifier.

2. A thermoplastic molding material, comprising as essential components:
   A) 5 to 92% by weight of a polyphenylene ether;
   B) 5 to 92% by weight of a nylon;
   C) 3 to 50% by weight of a copolymer which does not form a separate phase and which is a copolymer of 98.7% by weight styrene and 1.3% by weight monomethyl maleate; and
   D) 2 to 25% per weight of a styrene-butadienestyrene block copolymer rubber impact modifier.

3. A molded object obtained from the thermoplastic molding material as claimed in claim 1.

* * * * *